US005553742A

United States Patent [19]

Maruyama et al.

[11] Patent Number: 5,553,742

[45] Date of Patent: Sep. 10, 1996

[54] FLUID FEED APPARATUS AND METHOD

[75] Inventors: Teruo Maruyama, Hirakata; Yoshikazu Abe, Neyagawa; Yoshihiro Ikemoto, Katano, all of Japan

[73] Assignee: Matsushita Electric Industrial Co., Ltd., Osaka-fu, Japan

[21] Appl. No.: 408,945

[22] Filed: Mar. 23, 1995

[30] Foreign Application Priority Data

Mar. 23, 1994 [JP] Japan .................................... 6-051807

[51] Int. Cl.[6] ...................................................... G01F 11/00

[52] U.S. Cl. .............................. 222/1; 222/404; 222/413; 222/504; 417/410.3; 418/48

[58] Field of Search ............................... 222/1, 404, 413, 222/504; 417/410.3; 418/48

[56] References Cited

U.S. PATENT DOCUMENTS 4,778,080 10/1988 Ono et al. ........................... 222/413 X

FOREIGN PATENT DOCUMENTS 0142077 7/1985 Japan ........................................ 418/48

2037372 7/1980 United Kingdom ...................... 418/48

*Primary Examiner*—Joseph A. Kaufman

*Attorney, Agent, or Firm*—Wenderoth, Lind & Ponack

[57] ABSTRACT

A fluid feed apparatus includes a suction hole and a discharge hole for a fluid, a fluid transfer part provided between a rotor and a stationary member containing the rotor, a shaft coupled with the rotor, a rotation actuator for rendering a relative rotating motion between the shaft and the stationary member in a surface perpendicular to an axis of the shaft, a driving power supply for the rotation actuator, a rotating motion control unit for the rotation actuator, a swing actuator for rendering a relative swinging motion between the shaft and the stationary member, a driving power supply for the swing actuator, and a swinging motion control unit for the swing actuator. Synchronous control is performed by the rotating motion control unit and the swinging motion control unit so that the rotating motion and the swinging motion are synthesized to implement a revolving motion.

9 Claims, 10 Drawing Sheets

FLUID FEED APPARATUS AND METHOD

BACKGROUND OF THE INVENTION

The present invention relates to a fluid feed apparatus and method for quantitatively discharging and feeding various types of fluids such as adhesives, clean solder, grease, paints, hot melts, chemicals, and foods, in manufacturing processes of electronic components, household electrical appliances, and other fields.

Liquid dispensers have conventionally been used in various fields. With recent years' needs for downsizing and higher recording density of electronic components, there is a growing demand for a technique to control fluid materials with high accuracy and stability.

For example, in the field of surface mount technology (SMT), whereas there are trends toward faster, very-smaller, higher-density, higher-grade, and unmanned mounting techniques, problems that the dispensers have been facing can be summarized into:

1) Higher accuracy of the quantity of fluid material to be applied;

2) Shorter discharging time; and

3) Very-smaller quantity of material to be applied at each one-time dispensation. As the conventional liquid dispenser, such a dispenser using the air pulse method as shown in FIG. 12 has been widely used, hitherto. Its technique is introduced, for example, in "Jidoka Gijutsu (Automation Technology), '93, Vol. 25, No. 7." The dispenser using the method works in such a way that a constant amount of air supplied from a constant-pressure source is pulsatively applied into a container 150 (cylinder) so that a constant amount of fluid corresponding to an increase of the internal pressure of the container 150 is discharged.

As an alternative of the aforementioned air pulse method, a dispenser using a single-shaft eccentric pump of the rotary displacement type, which is commonly known as Moyno pump, has been put into practical use. The Moyno pump is also called a snake pump after its snake-like motion. Details of the technique are introduced, for example, in "Haikan Gijutsu (Piping Technology), July '85." FIG. 11 illustrates an example of its construction.

Reference numeral 100 denotes a main shaft (drive shaft), 101 denotes a ball bearing, 102 denotes a rotor of a snake pump, 103 denotes a stator thereof, 104 and 105 denote universal joints for coupling the rotor 102 with a coupling rod 106 and coupling the coupling rod 106 with the drive shaft 100. The rotor 102 is, so to speak, a male screw having a circular cross section, while the stator 103 as a female screw corresponding to the male screw having a hole cross section formed into an oval shape.

The rotor 102 is fitted into the stator 103. When the rotor 102 is rotated at the eccentric shaft center, the rotor 102 is put into up-and-down motion with rotation inside the stator 103. The fluid entrapped between the rotor 102 and the stator 103 is continuously fed out from suction to discharge side by an endless, limitless piston motion.

However, dispensers of these methods have had the following problems.

[1] Problem of the dispenser of the air pulse method:

(1) Variations in the discharge amount due to discharge-pressure pulsation;

(2) Variations in the discharge amount due to differences in head of fluid; and (3) Changes in the discharge amount due to changes in the viscosity of fluid.

The shorter the operating time and the shorter the discharging time, the more noticeably the phenomenon (1) appears. On this account, measures have been taken such as providing a stabilizing circuit for ensuring a uniform height of air pulses.

The reason of the problem (2) is that since the capacity of a void portion 152 within the cylinder differs depending on the liquid remaining level H, the degree of pressure change in the void portion 152 varies to a large extent depending on the H with a constant-amount feed of high-pressure air. With a drop of the liquid remaining level, the application amount would decrease to, for example, 50 to 60% of the maximum value, as a problem. For this reason, there have been taken measures such as detecting the liquid remaining level H for each-time discharging operation and adjusting the time duration of pulses so that a uniform discharge amount is ensured.

The problem (3) takes place, for example, when a material containing a large amount of solvent has undergone a change in viscosity with time. One of the countermeasures for this problem has been that the tendency of viscosity change with respect to the time axis is previously programmed in a computer and, for example, the pulse width is adjusted so that any influence of viscosity change is corrected.

In any of the countermeasures for the above problems, the control system including a computer becomes complex whereas there is a difficulty in managing irregular variations in environmental conditions (e.g., temperature). Thus, none of the above countermeasures has been a drastic solution.

[2] Problems of the dispenser using a snake pump:

When the snake pump is involved, the dispenser is the displacement type in which the fluid is entrapped in a closed space of constant capacity and transferred as such. Therefore, the dispenser has a constant flow rate characteristic that it is less affected by viscosity change, load change on the pump discharge side, or the like, as compared with the above-described dispenser of the air pulse method. However, in the pump of the present method, which owes its pumping action to the operation that the rotor 102 is put into a reciprocating linear motion while it is rotating within the stator 103, the rotor 102 has principally a one-sided support structure and the stator 103 serves also as a bearing that supports the rotor 102.

Accordingly, when the rotation speed of the drive shaft 100 is increased, or when the discharge-side pressure increases due to an increase in the pump load, the rotor 102, which has only a poor positioning-holding function, is likely to result in an unstable motion. As a result, the clearance between the rotor 102 and the stator 103 would vary, which in turn would cause the internal leak amount to vary, incurring a problem of deteriorated flow rate accuracy. Another serious problem would be changes with years in the flow rate characteristic due to eccentric wear of the stator 103 and the rotor 102. Therefore, when the rotor is reduced in diameter for a snake pump to be used as a dispenser, the accuracy of the total discharge flow would be at most ±10 to 20% on the aforementioned accounts.

Also, for example, when the dispenser is attempted to reduce the rotor diameter to D=0.5 mm $\phi$ or less in response to a demand for an ultra-low flow rate of the dispenser (e.g., $Q=10^{-5}$ $cm^3$/sec or less), the conventional structure involving metal-to-metal contact between rotor and stator would undergo elastic deformation, sliding wear, damage, and the like due to a deterioration of the rotor strength because the rotor is driven by the metal-to-metal contact without any adjustment thereof. Thus, the attempt has been far from practical use.

SUMMARY OF THE INVENTION

An object of the present invention is to provide a fluid feed apparatus and method capable of reducing elastic deformation, sliding wear, damage, and the like due to a deterioration of the rotor strength.

In accomplishing these and other objects, according to one aspect of the present invention, there is provided a fluid feed apparatus comprising: a suction hole and a discharge hole for a fluid; a fluid transfer part provided between a rotor and a stationary member containing the rotor; a shaft coupled with the rotor; a rotation actuator for rendering a relative rotating motion between the shaft and the stationary member in a surface perpendicular to an axis of the shaft; a driving power supply for the rotation actuator; a rotating motion control unit for the rotation actuator; a swing actuator for rendering a relative swinging motion between the shaft and the stationary member; a driving power supply for the swing actuator; and a swinging motion control unit for the swing actuator, wherein synchronous control is performed by the rotating motion control unit and the swinging motion control unit so that the rotating motion and the swinging motion are synthesized to implement a revolving motion.

According to another aspect of the present invention, there is provided a fluid feed method using a fluid feed apparatus comprising: a suction hole and a discharge hole for a fluid; a fluid transfer part provided between a rotor and a stationary member containing the rotor; a shaft coupled with the rotor; a rotation actuator for rendering a relative rotating motion between the shaft and the stationary member in a surface perpendicular to an axis of the shaft; a driving power supply for the rotation actuator; a rotating motion control unit for the rotation actuator; a swing actuator for rendering a relative swinging motion between the shaft and the stationary member; a driving power supply for the swing actuator; and a swinging motion control unit for the swing actuator, the method comprising steps of: rotating the shaft by the rotation actuator and swinging the shaft by the swing actuator; and performing synchronous control by the rotating motion control unit and the swinging motion control unit so that the rotating motion and the swinging motion are synthesized to implement a revolving motion.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
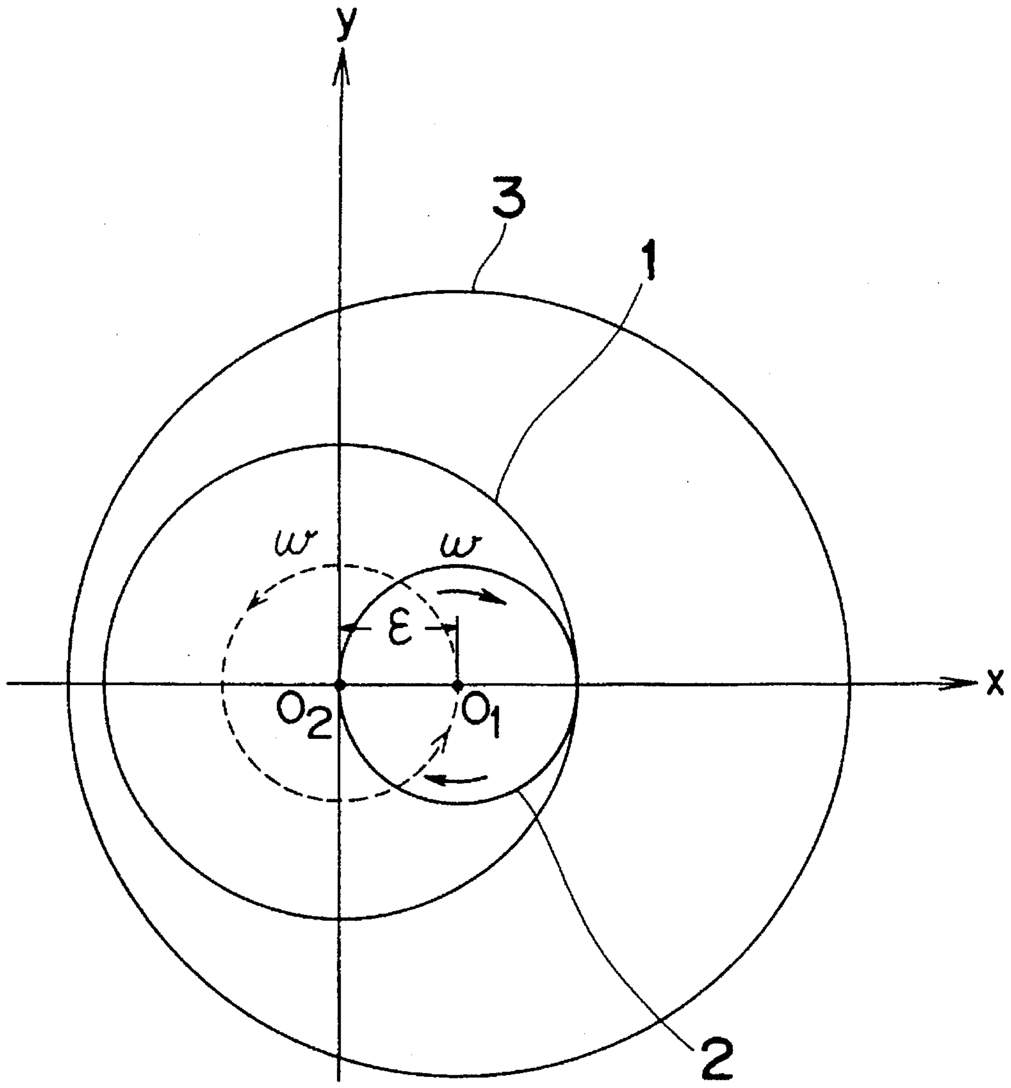
FIG. 1 is a view showing the principle of drive of the snake pump, which is the objective of the present invention.

Before the description of the present invention proceeds, it is to be noted that like parts are designated by like reference numerals throughout the accompanying drawings.

In a snake pump, which is the objective of the present invention, since a rotor is put into a linear reciprocating motion inside a stator having an oval cross section, a drive-side main shaft coupled with the rotor is rotated at the center of the eccentric main shaft while the main shaft is undergoing an eccentric motion (a swinging motion) in a surface perpendicular to an axis of the main shaft. FIG. 1 shows the principle of operation of the snake pump, where reference numeral 1 denotes a base circle and 2 denotes an inscribing circle thereof. $O_1$ represents the center of the inscribing circle 2, $O_2$ represents the center of the eccentric motion of the rotor, and numeral 3 denotes a main shaft taking $O_1$ as its center. When the inscribing circle 2 rolls and rotates at a rotating speed of ω inside the base circle 1, then the inscribing circle center $O_1$ swings at a rotating speed of ω about the center $O_2$. As a result, the main shaft 3 of the snake pump swings at an eccentricity amount ε about the center $O_2$ while it rotates at the rotating speed of ω.

The rotor in a portion of the pump where the fluid is transferred (not shown in FIG. 1, e.g., indicated by 25 in FIG. 2) is formed into a circle having its center on the circumference of the inscribing circle 2. The rotor, which is contained in the stator having an oval cross section (not shown in FIG. 1, e.g., indicated by 26 in FIG. 2), is put into a linear motion passing through the origin $O_2$.

In the fluid feed apparatus to which the present invention is applied, the main shaft 3 is given a swinging motion and a rotating motion at the same time by two actuators which are independent of each other. The rotation actuator renders a rotational motion with a rotating speed of ω by means of an AC servomotor or pulse motor or the like. Meanwhile, the swing actuator renders a regular swinging motion by a combination of microactuator sine-wave drives having a 90° phase shift, for example, between X-axis and Y-axis. This swinging motion is a turning motion of rotating about the origin $O_2$ at a rotating speed of ω.

In the case of a very-small-flow-rate dispenser with an extremely small discharge amount, attention should be focused on the fact that both the rotor diameter of the snake pump and the eccentricity amount of the swinging motion (ε in FIG. 1) may be extremely small. In this case, applicable as the swing actuator are a magnetic bearing, a piezoactuator, or the like that can produce a displacement of, for example, about 0.1 to 0.5 mm.

The two motions of rotation and swinging are controlled for such synchronization that their phase difference is held constant. For example, the phases of the swinging and rotating motions are determined based on one reference signal. By this synchronization control, the main shaft 3 performs a composite motion unique to the Moyno pump. As a result, the closed space formed between rotor and stator moves step by step from suction to discharge side, so that a continuous pumping action can be obtained.

An embodiment in which the present invention is applied to a dispenser for feeding a very small flow rate of liquid is described below.

Figure 2:
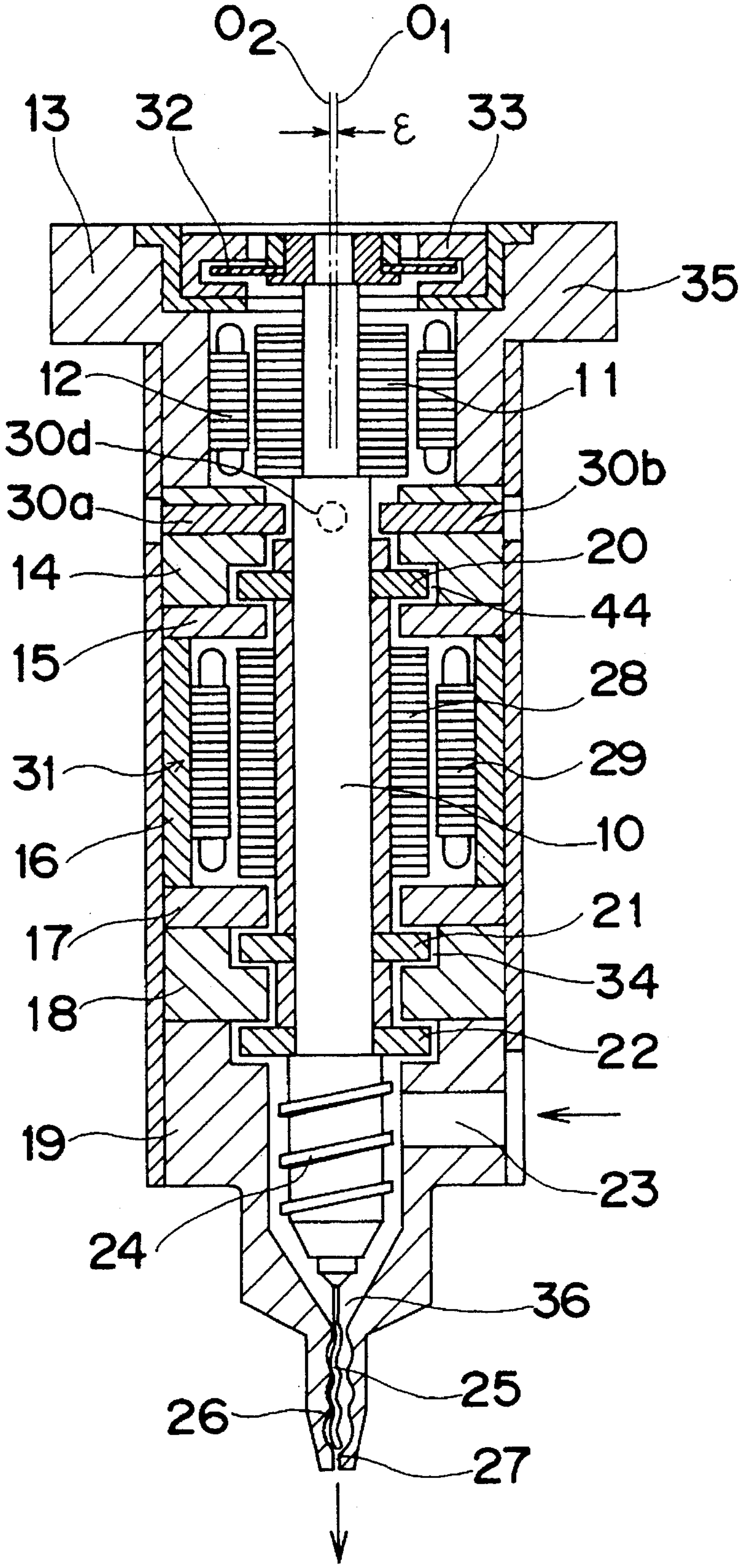
FIG. 2 is a front sectional view showing a first embodiment of the present invention.

Referring to FIG. 2, reference numeral 10 denotes a main shaft, 11 denotes a rotor of a motor, which is a rotation actuator, 12 denotes a stator of the motor, 13 to 19 denote stationary members, 20 and 21 denote an upper lower thrust fluid bearing and a lower thrust fluid bearing, respectively, formed between the stationary members 13, 14, 15, 16, 17, 18, 19 and the main shaft 10, 22 denotes a seal portion formed into a flange shape, 23 denotes a suction hole, 24 denotes a thread groove pump formed on the main shaft 10, 25 denotes a rotor of a snake pump, 26 denotes a stator of the snake pump, and 27 denotes a discharge nozzle. It is noted that only the parts of the rotor 25 and the stator 26 of the snake pump are more or less exaggerated in the shape of their amplitudes. Reference numeral 28 denotes a rotor of a magnetic bearing, which is a swing actuator, 29 denotes a stator of the magnetic bearing, 30*a* and 30*b* denote X-axis displacement sensors for detecting the radial position of the main shaft 10, and 30*c* (not shown) and 30*d* (shown by a chain line) denote Y-axis displacement sensors.

The X-axis displacement sensors 30*a*, 30*b* and the Y-axis displacement sensors 30*c*, 30*d* are arranged so as to be perpendicular to each other. The Y-axis sensor 30*d* arranged on the rear side of the drawing is indicated by the chain line. The radial position of the shaft center $O_1$ of the main shaft 10 is determined by the rotor 28, the stator 29, the X-axis displacement sensors 30*a*, 30*b*, and the Y-axis displacement sensors 30*c*, 30*d*, and a magnetic bearing actuator 31 for generating a regular swinging motion in a surface perpendicular to an axis of the main shaft 10 is further provided at the shaft center $O_1$. Also, reference numeral 32 denotes a rotor of an encoder for detecting the rotating angle and the rotating speed of the main shaft 10, and 33 denotes a stator thereof, where the rotor 32 and the stator 33 are provided between the main shaft 10 and the stationary member 13. Also, the rotor 11, the stator 12, the rotor 32, and the stator 33 constitute a rotation actuator 35 for regularly rotating the main shaft 10 based on rotational position information derived from the encoder.

Figure 3:
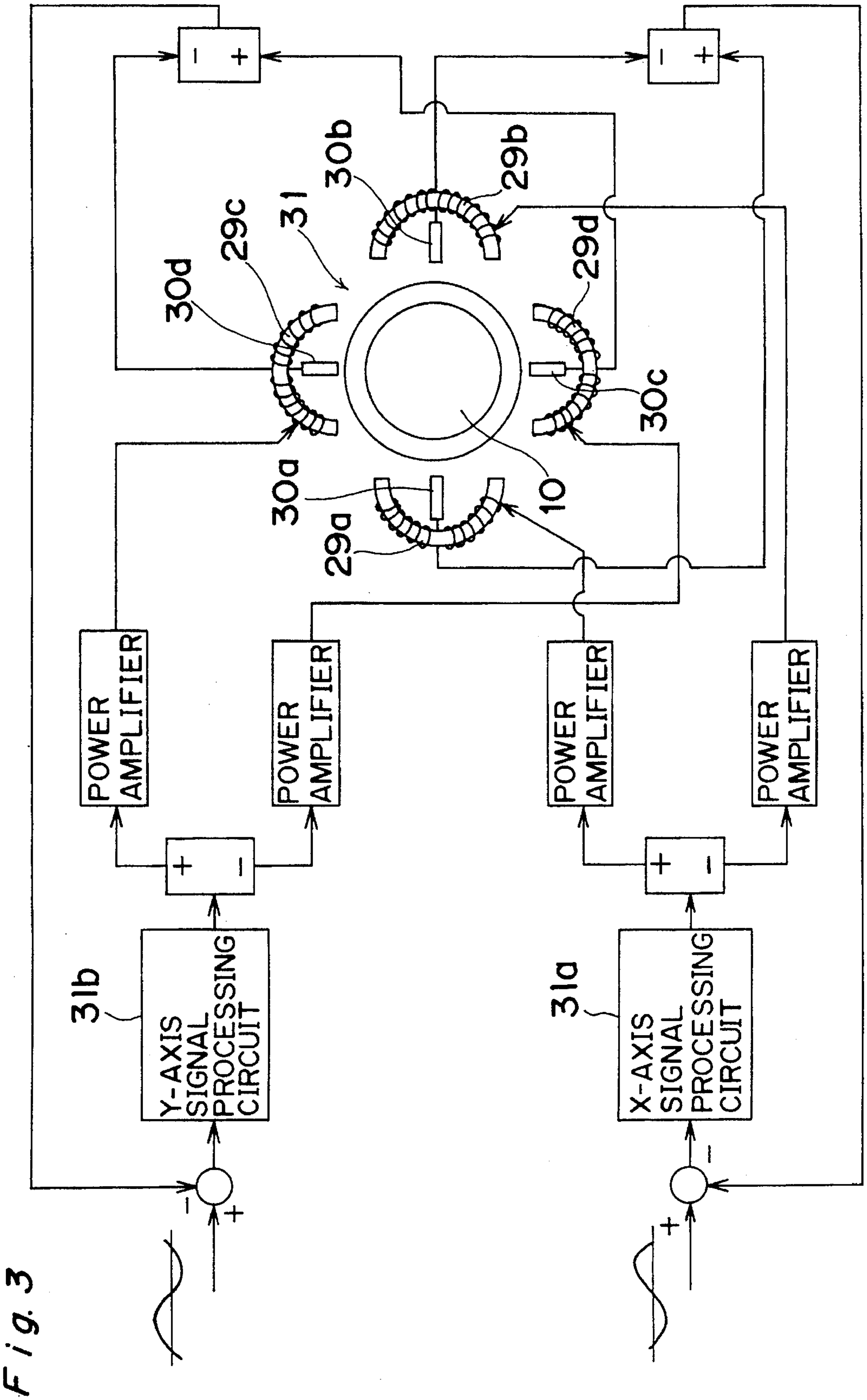
FIG. 3 is a block diagram of the swinging motion control unit of a first embodiment.

FIG. 3 shows a block diagram of a swinging motion control unit 81 for driving the magnetic bearing actuator 31. In this swinging motion control unit 81, the shafts of the magnetic bearing are driven in synchronization with the rotating motion. In FIG. 3, a model configuration of the magnetic bearing is depicted, where the stator 29 is composed of X-axis stators 29*a*, 29*b* and Y-axis stators 29*c*, 29*d*. To impart a swinging motion to the main shaft 10, sine waves having a phase difference of 90° are given to the drive circuit for the X-axis stators and the Y-axis stators.

Figure 4:
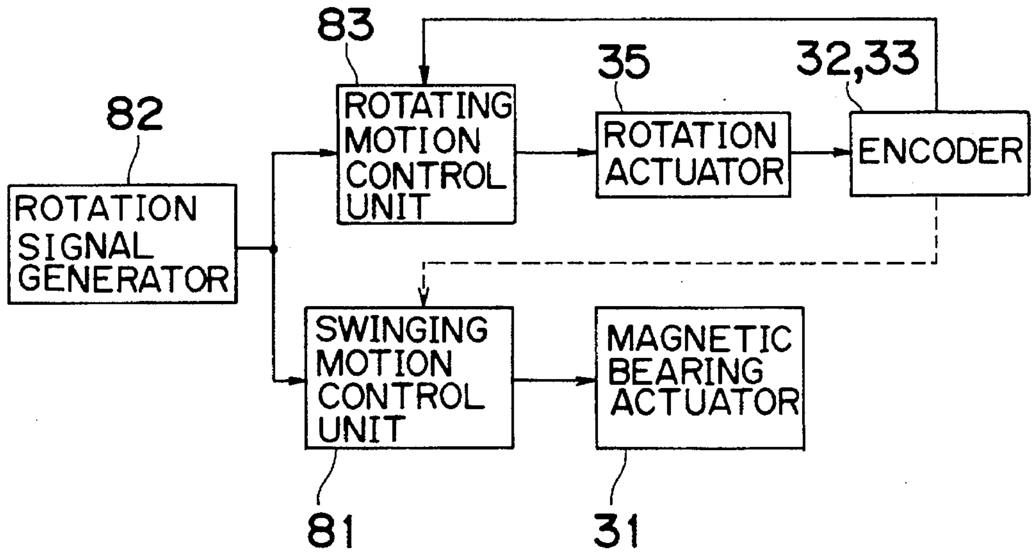
FIG. 4 is a block diagram showing the whole control circuit of the first embodiment.

FIG. 4 is a block diagram of the entire control circuit of the present embodiment..

A rotation signal generator 82 outputs a frequency (a pulse train) by which the rotating speed and the rotating position are determined. The output is fed to a rotating motion control unit 83 and a swinging motion control unit 81. The rotating motion control unit 83 generates a signal for controlling the drive of the rotation actuator 35. The encoder having the rotor 32 and the stator 33 detects the rotating angle and the rotating speed of the main shaft 10 and the detected result of the encoder is inputted into the rotating motion control unit 83 and the swinging motion control unit 81 for feed-back control.

Figure 5:
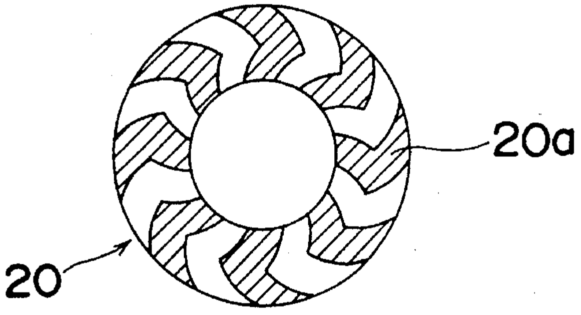
FIG. 5 is a view showing a thrust fluid bearing of the first embodiment.

On the other hand, the swinging motion control unit 81 transmits the pulse train derived from the rotation signal generator 82 to X-axis and Y-axis signal processing units 31*a*, 31*b* (FIG. 3) of the magnetic bearing actuator 31. It is noted that feeding back the output derived from the encoder 32, 33 to the swinging motion control unit 81 as shown by a chain line in FIG. 4 makes it possible to control the phase between the rotating motion and the swinging motion more accurately. In FIG. 2, the thrust fluid bearings 20, 21 are known dynamic-pressure bearings in which a shallow groove 20*a* of a so-called herringbone shape is formed on the flange surface, and an example of its shape is shown in FIG. 5. Lubricating oil 33, 34 is entrapped between the thrust fluid bearings 20, 21 and the stationary members 14, 18. By the pumping effect of the shallow groove 20*a*, the lubricating oil 34, 44 will never flow out.

The main shaft 10 is supported by the thrust fluid bearings 20, 21 so that its axial position is restricted without tilt. Accordingly, the main shaft 10 can perform the swinging motion while the main shaft 10 maintains positioned vertical by virtue of the driving force of the magnetic bearing actuator 31.

The seal portion 22 having the flange shape is provided for the purpose of preventing the fluid under transfer from invading the fluid bearings and the magnetic bearings. The clearance between the flange and an axially opposite surface is set to a substantially small one.

The thread groove pump 24 is provided in the present embodiment so as to facilitate the inflow of the fluid under transfer into the snake pump.

In the case of a snake pump of the conventional apparatus using universal joints (FIG. 11), if a clearance is provided between a rotor 102 and a stator 103 thereof, then the rotor 102 comes into a floating state within a range of the clearance. As a result, the internal leak amount would vary under influences of unstable behavior of the rotor 102, incurring variations in the flow rate accuracy. In the embodiment of FIG. 2 to which the present invention is applied, the motion of the rotor 25 and its absolute position are fully restricted by the main shaft 10 on the upper drive side. Therefore, the rotor 25 having a complex snake shape can hold out of contact with the stator 26 during operation. The clearance between the rotor 25 and the stator 26 in one cycle of the motion has a variation characteristic of constant synchronization at any time and any point because the motion trace of the main shaft 10 is constant. Accordingly, the influence of internal leak on the discharge flow rate is also constant, so that even if the clearance between the rotor 25 and the stator 26 is more or less large, a variation-free discharge flow rate as previously predicted can be obtained.

Figure 11:
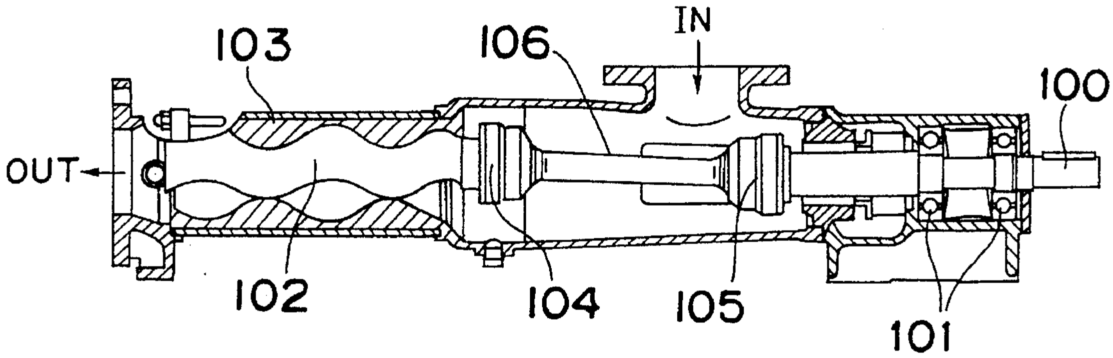
Fig. 11 PRIOR ART
FIG. 11 is a front sectional view of a known snake pump.
Figure 12:
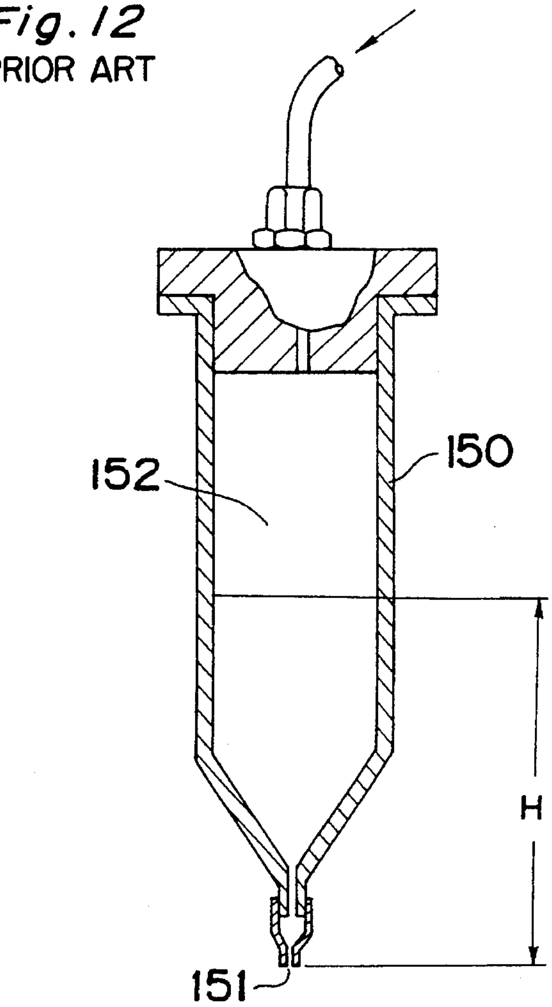
Fig. 12 PRIOR ART
FIG. 12 is an arrangement view showing an air pulse dispenser.

Also, in the pump of the present embodiment, between the rotor 25 and the main shaft 10 there are no obstacles that would hinder the flow of fluid under transfer, such as the conventional universal joints (104, 105 in FIG. 11). Thus, the snake pump can be reduced in size for the sake of very small flow amount, and even if an opening 36 at its entrance becomes smaller, the fluid under transfer can be injected into the snake pump smoothly.

Figure 6:
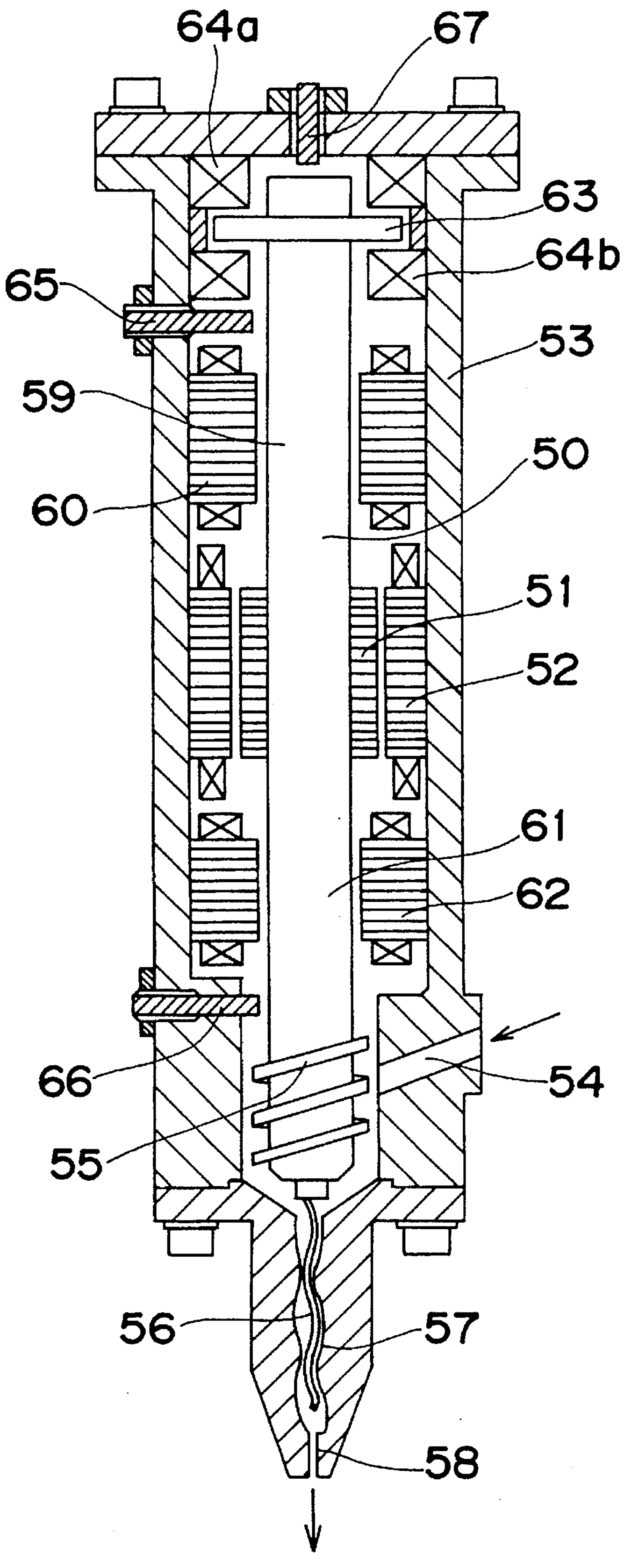
FIG. 6 is a front sectional view showing a second embodiment of the present invention.

FIG. 6 shows a second embodiment of the present invention, in which case a dispenser comprises five-shaft control magnetic bearings serving as a swing actuator and a motor.

Reference numeral 50 denotes a main shaft, 51 denotes a rotor of a pulse motor, which is a rotation actuator, 52 denotes a stator of the pulse motor, 53 denotes a fixed sleeve, 54 denotes a suction hole, 55 denotes a thread groove pump formed on the main shaft 50, 56 denotes a rotor of a snake pump, 57 denotes a stator of the snake pump, and 58 denotes a discharge nozzle. Reference numeral 59 denotes a rotor of an upper magnetic bearing, 60 denotes a stator thereof, 61 denotes a rotor of a lower magnetic bearing, 62 denotes a stator thereof, 63 denotes a rotor of a thrust magnetic bearing, 64*a* and 64*b* denote stators. Further, reference numerals 65, 66, and 67 denote displacement sensors for the upper magnetic bearing 59, 60, the lower magnetic bearing 61, 62, and the thrust bearing 63, 64*a*, 64*b*, respectively.

The main shaft 50 is supported by the two radial bearings 59, 60, 61, 62 and the thrust bearing 63, 64*a*, 64*b*, so that it can be held completely out of contact whether it is under operation or at rest.

Figure 7:
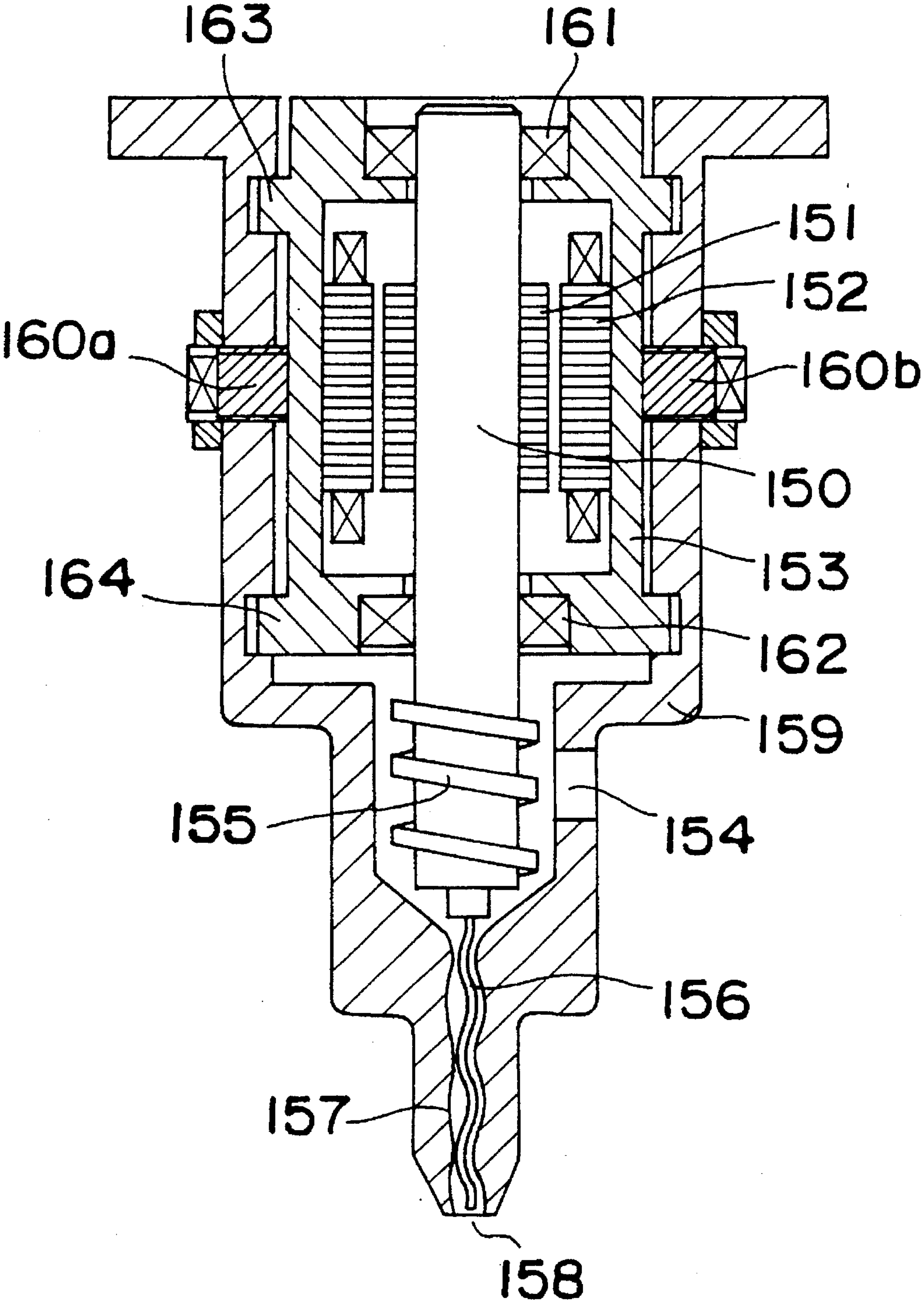
FIG. 7 is a front sectional view showing a third embodiment of the present invention.

FIG. 7 shows a third embodiment of the present invention, in which case piezoelectric devices are used as the swing actuator.

Reference numeral 150 denotes a main shaft, 151 denotes a rotor of a motor, which is a rotation actuator, 152 denotes a stator of the motor, 153 denotes a swing sleeve, 154 denotes a suction hole, 155 denotes a thread groove pump formed on the main shaft 150, 156 denotes a rotor of a snake pump, 157 denotes a stator of the snake pump, and 158 denotes a discharge nozzle. Reference numeral 159 denotes a fixed sleeve, 160*a* and 160*b* denote piezoelectric actuators provided between the fixed sleeve 159 and the swing sleeve 153, and 161 and 162 denote bearings for supporting the main shaft 150 within the swing sleeve 153. Reference numeral 163 and 164 denote guide portions for making the swing sleeve 153 movable only in the radial direction.

The above description of embodiments of the present invention has been made on the case where two independent actuators are used to obtain a composite motion of swinging and rotation.

Now another embodiment of the present invention in which a non-contact type snake pump comprises one actuator (motor) is described below.

Figure 10:
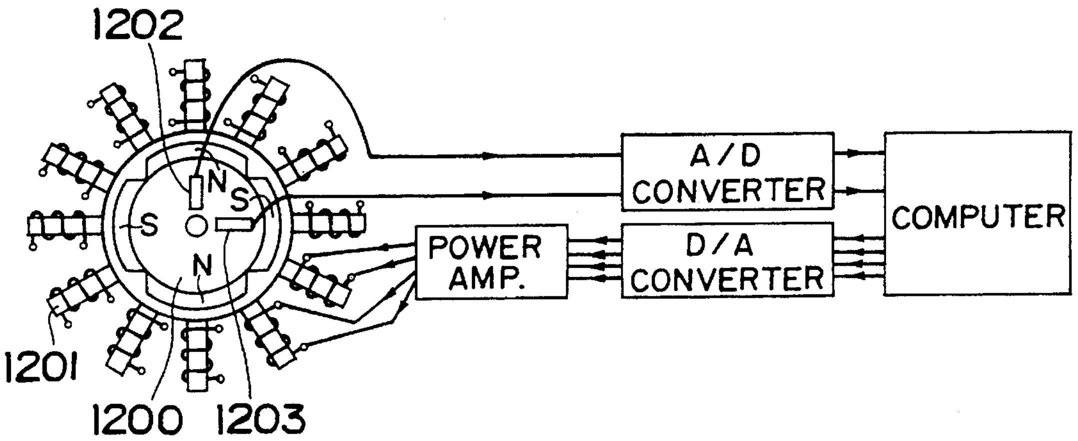
FIG. 10 is a principle view of a known rotary floating motor.

Research and development has hitherto been made on a floating rotary motor that serves for two functions as a magnetic bearing and a motor. One example is reported in the Proceedings of a Conference of the Machinery Society written by Oishi et al. (Vol. 58, No. 556, 1992). FIG. 10 illustrates the reported example.

Reference numeral 1200 denotes a rotor formed of permanent magnets of four poles, 1201 denotes stators formed of twelve poles, and 1202 and 1203 denote displacement sensors. It has been theoretically established that rotation control and float control will not interferer with each other by combining the permanent magnet rotor with the multipole stators in the above way, and by giving rotational magnetic fields having different phase differences for the rotation control and the float control.

Whereas the rotary floating motor is known as above, it needs a displacement sensor for detecting the position of the rotor 200 and a control circuit, as in the conventional magnetic bearings.

Figure 8:
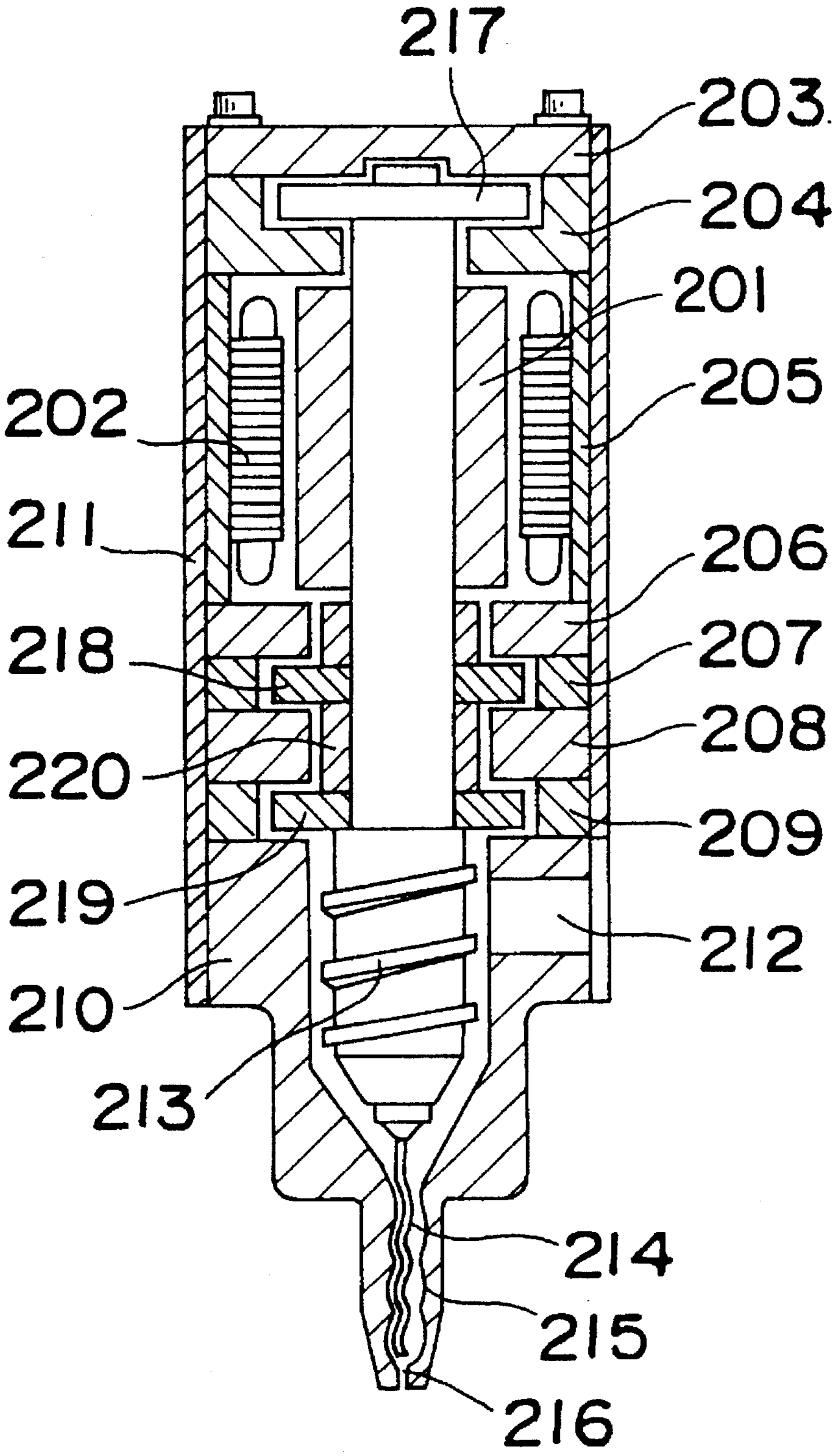
FIG. 8 is a front sectional view showing a fourth embodiment of the present invention.
Figure 13:
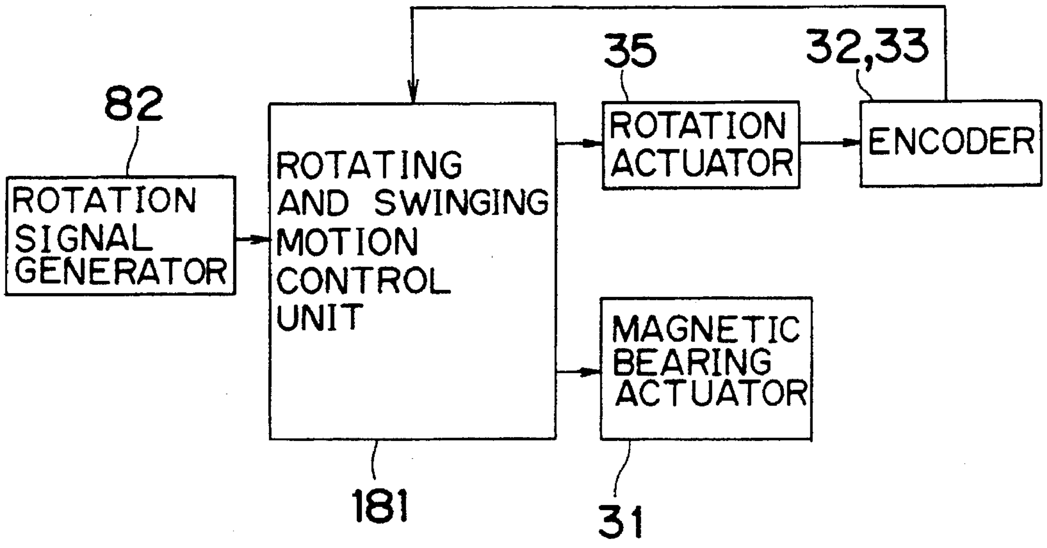
FIG. 13 is a block diagram showing the whole control circuit of the embodiment in FIG. 8.

FIG. 8 shows a fourth embodiment of the present invention. Reference numeral 200 denotes a main shaft, 201 denotes a rotor of a motor, which serves as both a rotation actuator and a swing actuator, 202 denotes a stator thereof, 203 to 210 denote stationary members, 211 denotes a casing for housing the stationary members, 212 denotes a suction hole, 213 denotes a thread groove pump formed on the main shaft 200, 214 denotes a rotor of a snake pump, 215 denotes a stator of the snake pump, 216 denotes a discharge nozzle, 217 denotes an upper thrust bearing, 218 denotes a lower thrust bearing, 219 denotes a seal portion, 220 denotes a radial displacement restricting rotor fitted to the main shaft 200, and 221 denotes lubricating oil entrapped in the clearance between 208 and 220. The stationary member 208 serves also as a radial displacement restricting stator. FIG. 13 is a block diagram showing the whole control circuit of the embodiment in FIG. 8 which is almost the same as that in FIG. 4 except that the rotating motion control unit 83 and the swinging motion control unit 81 are combined into one rotating and swinging motion control unit 181.

Now attention is paid to the following points (1) and (2):

(1) In the case of a very small flow rate dispenser, the eccentricity amount $\epsilon$ of swinging motion needs only to be as very small as $\epsilon$=0.1 to 0.5 mm; and (2) The motion of the main shaft draws a constant locus (hypocycloid curve).

Figure 9:
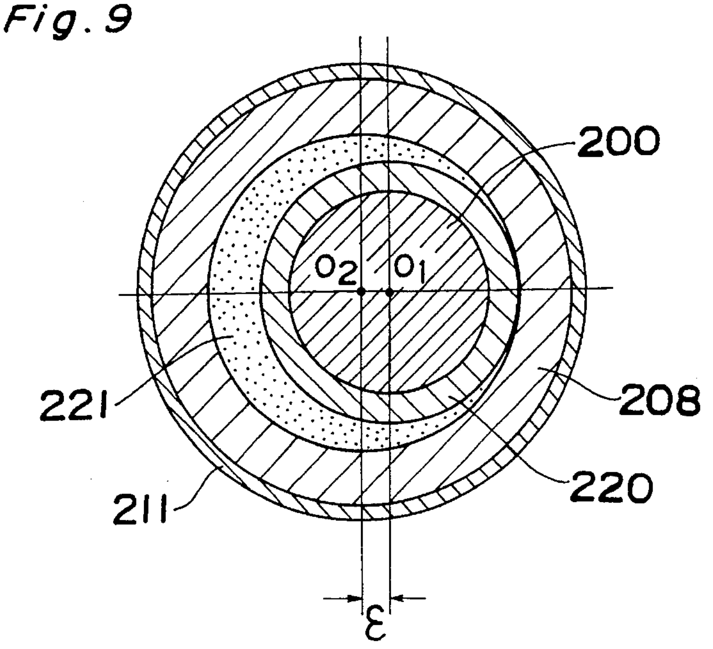
FIG. 9 is an arrangement view showing the radial displacement restricting part of FIG. 7.

In the present embodiment making use of the above (1) and (2), the radial position of the main shaft 200 is restricted by the radial displacement restricting stator 208 as shown in FIG. 9. Accordingly, even if a composite motion of rotation and swinging is given to the main shaft 200 by using the principle of the rotary floating motor, it is needless to control the axial position of the main shaft 200. It is sufficient to press the radial displacement restricting rotor 220 against the inner surface of the radial displacement restricting stator 208 as shown in FIG. 9. As a consequence, the control system can be simplified while the radial displacement sensor can be omitted.

In addition, as the magnetic floating motor used for the present embodiment, stepping motors, reactance motors, induction motors, and the like may also be applied as a matter of course.

The present invention makes it possible to provide a fluid feed apparatus having various characteristics that could not be realized by the conventional snake pump method or the air pulse method, without loosing the features of the pulse-free continuous flow rate characteristic, of which the snake pump is inherently possessed, the constant flow rate characteristic proportional to the rotation speed, a characteristic that the discharging flow rate is less affected by environmental conditions such as temperature, changes in viscosity, and the like. To summarize, the present invention has the following features:

(1) The flow rate can be enhanced to ultra-high accuracy (e.g. ±1 or 2% or less);

(2) The flow rate can be designed in ultra-low orders (e.g. $Q=10^{-5}cm^3/sec$ or less); and (3) The flow rate can be controlled over wider ranges.

When the present invention is applied as a dispenser, for example, for the surface mount technology, it can exhibit excellent features to demands for faster, very-smaller-flow-rate, higher-grade mounting technique, producing an outstanding effect.

In the apparatus, the rotor can be in contact with the stator while the contact pressure is controlled by the control units (circuits) 81, 83.

Instead of the piezoelectric actuator, an electrostriction element or magnetostriction element may be used.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A fluid feed apparatus comprising:

a suction hole and a discharge hole for a fluid;

a fluid transfer part provided between a rotor and a stationary member containing the rotor;

a shaft coupled with the rotor;

a rotation actuator for rendering a relative rotating motion between the shaft and the stationary member in a surface perpendicular to an axis of the shaft;

a driving power supply for the rotation actuator;

a rotating motion control unit for the rotation actuator;

a swing actuator for rendering a relative swinging motion between the shaft and the stationary member;

a driving power supply for the swing actuator; and a swinging motion control unit for the swing actuator, wherein synchronous control is performed by the rotating motion control unit and the swinging motion control unit so that the rotating motion and the swinging motion are synthesized to implement a revolving motion.

2. The fluid feed apparatus according to claim 1, wherein the fluid transfer part is a single-shaft eccentric screw pump.

3. The fluid feed apparatus according to claim 1, wherein the synchronous control is performed by the rotating motion control unit and the swinging motion control unit so that the rotating motion and the swinging motion are synthesized to implement a revolving motion per one rotation.

4. The fluid feed apparatus according to claim 3, wherein the swing actuator is a magnetic bearing.

5. The fluid feed apparatus according to claim 3, wherein the swing actuator is a piezoelectric device.

6. The fluid feed apparatus according to claim 1, wherein functions of the rotation actuator and the swing actuator are implemented by the same motor.

7. The fluid feed apparatus according to claim 3, wherein the swing actuator is an electrostriction element.

8. The fluid feed apparatus according to claim 3, wherein the swing actuator is a magnetostriction element.

9. A fluid feed method using a fluid feed apparatus comprising: a suction hole and a discharge hole for a fluid; a fluid transfer part provided between a rotor and a stationary member containing the rotor; a shaft coupled with the rotor; a rotation actuator for rendering a relative rotating motion between the shaft and the stationary member in a surface perpendicular to an axis of the shaft; a driving power supply for the rotation actuator; a rotating motion control unit for the rotation actuator; a swing actuator for rendering a relative swinging motion between the shaft and the stationary member; a driving power supply for the swing actuator; and a swinging motion control unit for the swing actuator, the method comprising steps of:

rotating the shaft by the rotation actuator and swinging the shaft by the swing actuator; and performing synchronous control by the rotating motion control unit and the swinging motion control unit so that the rotating motion and the swinging motion are synthesized to implement a revolving motion.

* * * * *